Oct. 17, 1933.   L. D. SLADE   1,931,169
GEAR CUTTING TOOL
Filed Jan. 2, 1929   2 Sheets-Sheet 1
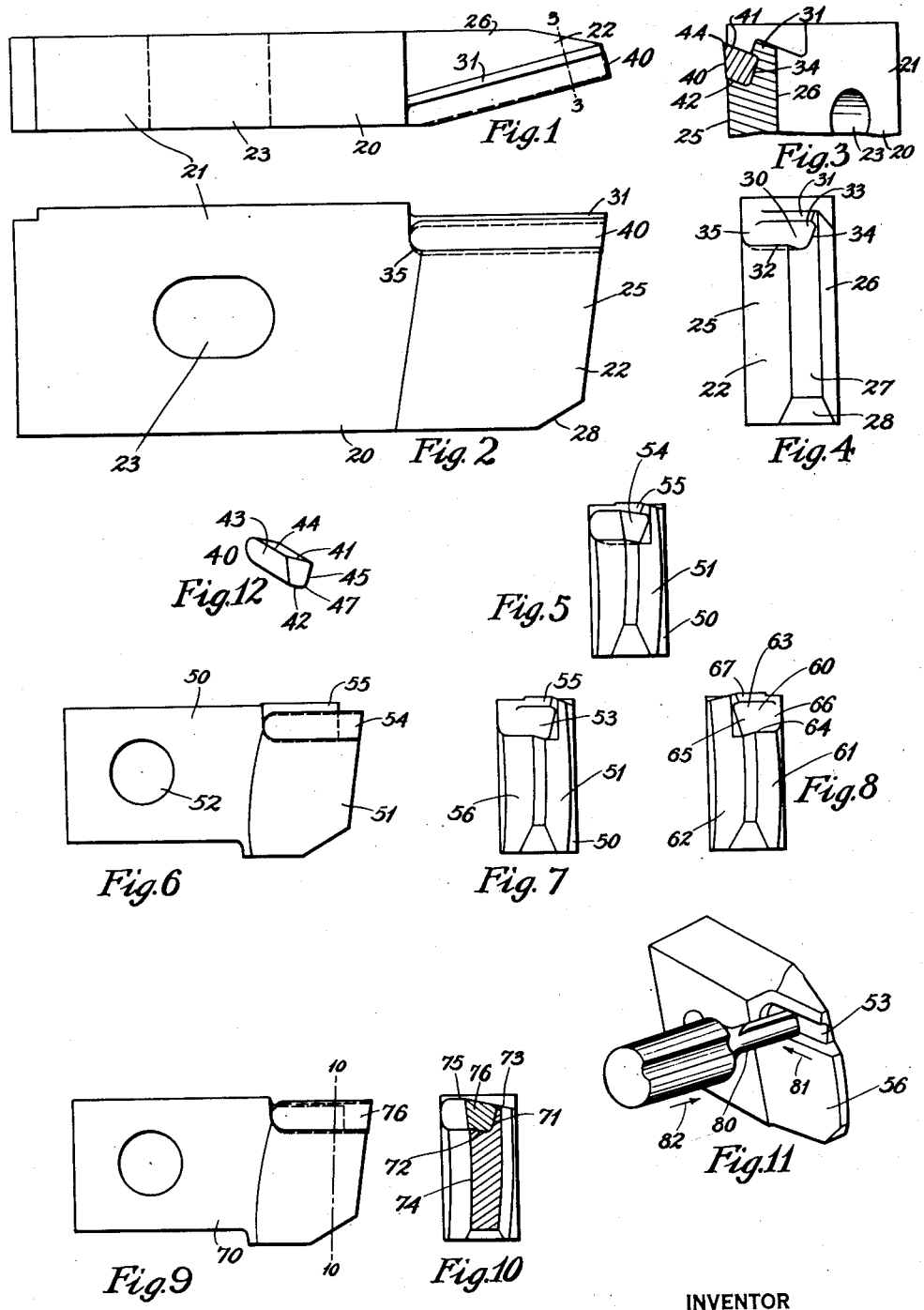
INVENTOR
Leon D. Slade
BY
ATTORNEY Oct. 17, 1933.    L. D. SLADE    1,931,169
GEAR CUTTING TOOL
Filed Jan. 2, 1929    2 Sheets-Sheet 2
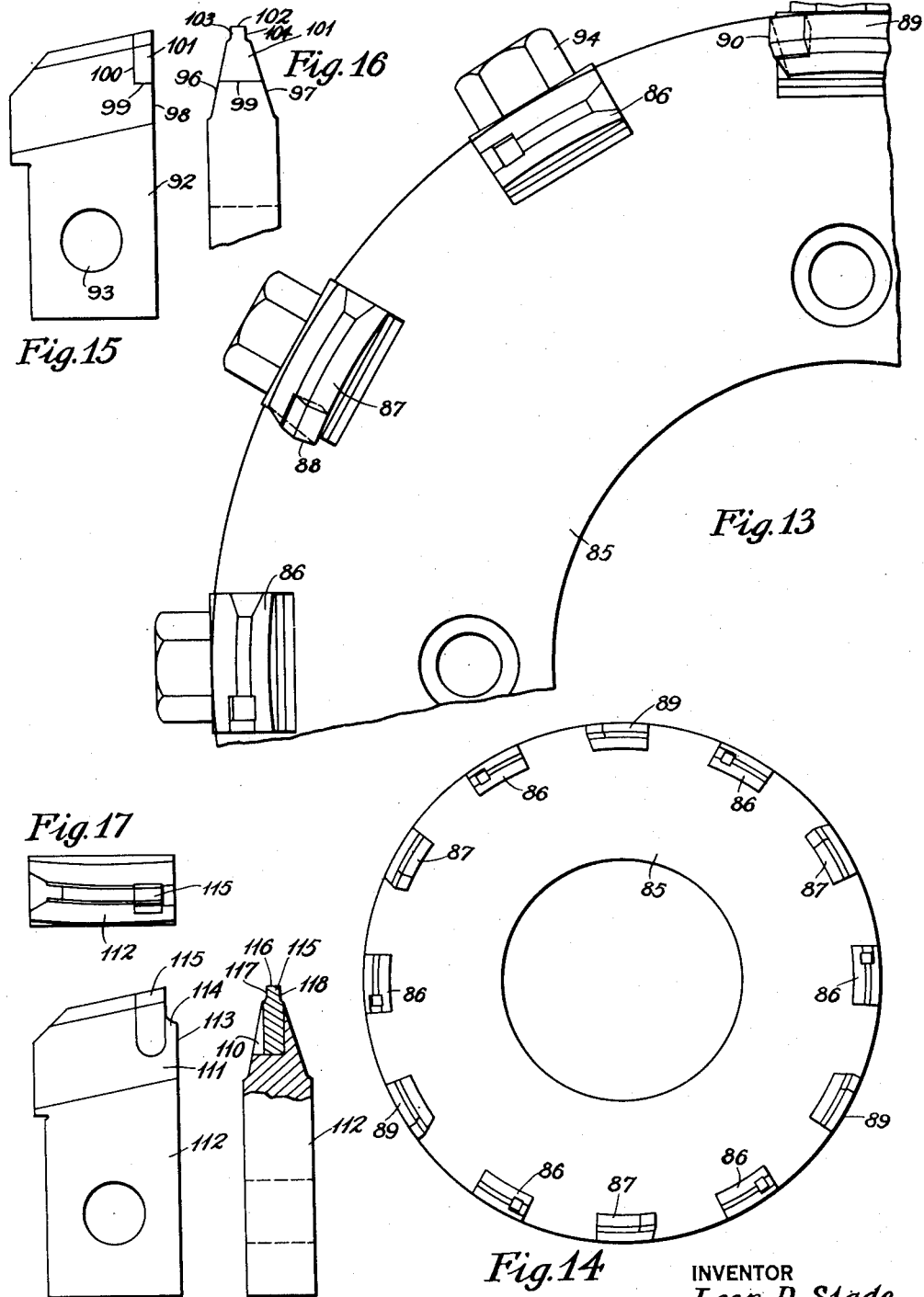
INVENTOR
Leon D. Slade
BY
ATTORNEY Patented Oct. 17, 1933

1,931,169

UNITED STATES PATENT OFFICE 1,931,169

GEAR CUTTING TOOL

Leon D. Slade, Rochester, N. Y., assignor to Gleason Works, Rochester, N. Y., a corporation of New York Application January 2, 1929. Serial No. 329,841

15 Claims. (Cl. 29—105)

The present invention relates to cutting tools and particularly to tools for cutting gears and has for its primary object to provide an efficient yet non-costly cutting tool or blade in which a cutting bit of a very hard material is employed as the cutting element and this is secured in a non-cutting body or holder of a suitable less expensive, softer material.

A further object of the invention is to provide a holder and bit of such shape that the bit may be securely mounted in the holder and that the thrust upon the bit encountered in cutting serves only to seat the bit more securely in the holder.

Further objects of the invention are to provide, as separate articles of manufacture, a cutting bit of a shape which will require a minimum of the expensive hard cutting material to make and a holder which can be simply and cheaply made and in which said bits can be rigidly secured.

A still further object of this invention is to provide a cutter for cutting longitudinally curved tooth gears having a plurality of inserted blades, each comprising a cutting bit and a suitable holder therefor, in which separate blades are provided for cutting the side faces and the bottom faces of the grooves of a gear blank.

Other objects of the invention will be apparent hereinafter from the specification when taken in connection with the drawings and from the appended claims.

In the drawings:

Figure 1 is an end view and Figure 2 a bottom plan view of a tool constructed according to one embodiment of this invention for cutting gears in a planing or reciprocating motion;

Figure 3 is a section on the line 3—3 of Figure 1;

Figure 4 is a side elevation of the holder shown in Figures 1 to 3 inclusive, the cutting bit being removed;

Figures 5 and 6 are a side elevation and a plan view, respectively, of a detachable blade constructed according to one embodiment of my invention which may be employed on a cutter of the face mill type for cutting longitudinally curved tooth gears;

Figure 7 is a view corresponding to Figure 5 with the cutting bit removed;

Figure 8 is an end elevation of a blade adapted to hold a cutting bit having an outside cutting edge (the bit shown in Figures 5 and 6 has an inside cutting edge and the holder shown in Figure 7 is for such a bit);

Figure 9 is a view similar to Figure 6 showing a modified form of face mill cutting blade constructed according to this invention;

Figure 10 is a section on the line 10—10 of Figure 9;

Figure 11 is a perspective view showing somewhat diagrammatically one method of slotting or grooving a bit-holder constructed according to this invention;

Figure 12 is a perspective view of the preferred form of side cutting bit (the bits for the reciprocating tools of Figures 1 to 4 inclusive may be of the same general shape as the bits employed in the face mill blades of Figures 5 to 10 inclusive differing only in their length);

Figure 13 is an enlarged fragmentary side elevation of a face mill cutter having both side and bottom cutting, or stocking blades;

Figure 14 is a side elevation of this cutter on a smaller scale;

Figures 15 and 16 are a plan and an end view, respectively, of one form of stocking blade;

Figures 17 and 18 are a side elevation and a plan view, respectively, of a stocking blade of a modified construction; and Figure 19 is an end view, partly in section, of the blade shown in Figures 17 and 18.

Metal cutting materials are known which are much harder than high speed steel, as for instance, tungsten carbide which is just below the diamond in hardness. Materials like tungsten carbide are either too expensive or lack strength, toughness, to make in themselves alone a satisfactory cutting tool or both these factors may be present. To provide these requisite strength and at the same time to reduce the cost, it has already been proposed to make tools of the hard expensive cutting material in the form of small bits. These are then secured in suitable holders of a softer, tougher and less expensive metal. The purpose of the present invention is to provide an improvement in the form of holder and bits so as to provide an improved cutting tool which has all the cutting qualities of the harder metal and the strength of the tougher holding metal and the cost of which will not be excessive. The purpose of this invention is to provide particularly a cutting tool of the type described which will be suitable for use in gear cutting.

Referring first to Figures 1 to 4 inclusive of the drawings. In these figures, there is shown one form of planing tool constructed according to this invention for cutting straight tooth gears or generally for cutting gears where the tool has a straight line reciprocating motion. 20 indicates the holder which, in general, may have the same shape as the high speed steel tools heretofore used. Thus, it may have a shank 21 and a blade portion 22. The shank 21 may be provided with the usual bolt hole 23 through which a bolt may be passed to secure the tool to the tool block on the gear cutting machine. These gear planing tools are usually made to cut one side face only of a gear blank and the tool shown in Figures 1 to 4 inclusive is of this type. The blade portion 22 tapers from the shank to its tip, being preferably made to the required pressure angle on one side 25 as clearly shown. The other side 26 may be of the shape usually employed in gear planing tools or may be of any other suitable form. The blade portion is relieved, that is, the sides converge from front to rear to provide clearance for the cutting edge. The tip 27 of the blade portion may, also, be inclined from front to rear to prevent dragging in the cut. The blade portion may, also, be beveled or chamfered according to the usual practise at 28 to prevent formation of a sharp, easily breakable corner.

The holder may be made of high speed steel, a suitable carbon steel or any other suitable material. The blade portion is slotted or grooved at one side, as indicated at 30 to provide a pocket in which the cutting bit is secured. In the form of the invention shown in Figs. 1 to 4, the pocket is formed in the side of the blade portion a sufficient distance back of the front face of the blade portion to provide a tongue or lip 31 which is adapted to extend in front of the cutting bit. The rear wall 32 of the pocket and the front wall 33 of the pocket, the latter being defined by the rear wall of the lip 31, are preferably made parallel to each other and the side wall 34 of the pocket is preferably made perpendicular to the front and rear walls 33 and 32. In the preferred construction, the bottom of the pocket is rounded as clearly shown in Figures 2 and 4 at 35. The front and rear walls 33 and 32, respectively of the pocket are preferably inclined to the side face 25 of the blade portion of the holder at an angle equal to the front shear angle which the cutting bit must have in order to cut cleanly. The term "front shear angle" is used in the art to which the invention refers to designate the angle between a line perpendicular to the work (a side tooth surface of a gear) and the front surface of the cutting blade or bit.

Tungsten carbide for cutting purposes is usually made up in the form of small bits of square or rectangular cross-section. These bits are made of powdered tungsten carbide held together by a suitable bond, as cobalt. With the front and rear walls 33 and 32 of the pocket 30 parallel to each other and the side wall 34 perpendicular to the front and rear walls, a square or rectangular bit can be readily mounted in the holder 20. With the rear wall 32 of the pocket inclined to the side face 25 of the holder at an angle equal to the front shear angle of the bit, no grinding of the bit will be required to provide the shear and, moreover, the cutting action serves only to seat the bit more securely in the holder as will be described more particularly hereinafter.

With the present invention, the square or rectangular bit of commercial use may be employed, if desired, by grinding away the outside face after the bit is secured in the holder in order to provide the clearance back of the cutting edge, but I prefer to make the bits of the shape shown in the figures of the drawings to avoid waste of material and grinding after the bit is in place in the holder.

Tungsten carbide is moldable into any suitable shape so that a cutting bit of the shape 40 can very readily be made. This cutting bit which constitutes one feature of the present invention is of general prismoidal shape. Its bottom surface, however, is rounded. In cross-section, the bit is of general trapezoidal shape, that is, its front and rear faces 41 and 42, respectively, are parellel to each other. The front face 41 and the outside face 43 are formed at an acute angle to each other to provide a side cutting edge 44. The inside face 45 is preferably made perpendicular to the front and rear faces 41 and 42, respectively.

The bit 40 may be brazed, welded or otherwise secured in the pocket 30 in the holder. When the bit is in position, as clearly shown in Figure 3, any cutting thrusts on the bit instead of tending to break down the braze or weld serve only to seat the bit more securely in the pocket, for with the side cutting edge 44, the thrusts set up in cutting a gear or other object tend to force the bit rearwardly and inwardly. The net result of this is that with the rear wall 32 of the pocket at an angle equal to the front shear angle of the bit, this rearward and inward thrust on the bit is concentrated at the point of junction of the side wall 34 and the rear wall 32 of the pocket and the bit is only forced the more securely into the pocket. Any tendency of these thrusts to rock the bit 40 in the pocket is counteracted by the lip 31, which prevents any rocking motion. With the construction shown then, the side cutting bit 40 is very securely held in the holder.

Aside from the fact that the construction described is adapted to provide a securer mounting for a side cutting bit there is a further advantage in making the rear wall 32 of the pocket at an angle equal to the side face 25 of the holder equal to the front shear angle of the bit and in making the front and rear faces 41 and 42 of the bit parallel to each other, as already indicated for with this construction, it is not necessary to grind away any of the bit when it has been secured in place in order to provide a proper front shear angle for the cutting edge 44. Were the pocket to be formed at right angles to the side face of the holder, it would be necessary to grind off enough of the front face of the bit to secure a proper front shear angle. With the construction shown, no grinding is necessary and no material is wasted.

In some instances, it may be desirable to round one or both of the inside corners of the bit to enable it to be more readily brazed into the holder. One of the edges or corners is shown so rounded at 47 in Figure 12.

The tool shown in Figures 1 to 4 inclusive is for cutting one side face of the teeth of a gear blank. For cutting the opposite side face, the holder and bit will be of the same general construction already described except that suitable provision will be made in the bit and holder to provide the required side cutting edge, as will be readily understood.

Figures 5 to 7 inclusive show one application of this invention to a cutting blade of the type employed in cutting longitudinally curved tooth gears. The holder, as before, is provided with a shank portion 50 and a blade portion 51. The shank 50 has a hole 52 through which a screw or bolt may be passed to secure the blade to the cutter head. The blade portion is curved from front to rear, as in the usual practise and the side is relieved to provide the required clearance for the cutting edge. A pocket 53 is formed in one side face of the blade portion to receive the cutting bit 54. The cutting bit 54 is of the same general shape as the cutting bit 40 except that it will be shorter. The pocket 53 is also of the same general shape as the pocket 30 being formed sufficiently back of the front face of the blade portion 51 to provide a lip 55 which prevents rocking of the cutting bit in the holder. The front and rear walls of the pocket 53 are parallel to each other and inclined to the side face 56 of the holder at an angle equal to the front shear angle of the cutting bit and the inside wall of the pocket is perpendicular to the front and rear walls thereof. As before, the front and rear faces of the bit are parallel to each other and the front face and outside face are inclined at an acute angle to each other to form a side cutting edge and to provide the requisite side clearance and front shear angle for this edge. The bit which again is made, preferably of tungsten carbide may again be brazed or welded or otherwise secured in the holder.

Figures 5, 6 and 7 show a blade for cutting one side face of a gear blank. Figure 8 shows the non-cutting portion of the blade which is adapted to receive a bit for cutting the opposite side face of the blank. In the latter case, the pocket 60 is formed in the opposite side face 61 of the holder 62. Save for this fact and for the necessary changes in position compatible with the altered purpose of the blade, the pocket 60 is of the same general conformation as the pockets 53 and 40 already described. Its front and rear walls 63 and 64, respectively, are parallel to each other being inclined to the side 61 of the holder at an angle equal to the front shear angle of the bit, the side wall 65 of the pocket is perpendicular to the front and rear walls and the bottom wall 66 of the pocket is rounded. The holder is provided with a lip 67 as before, which extends in front of and overlies the cutting bit when the same is in position in the pocket.

Figures 9 and 10 show a modification of the invention in which the pocket in the blade is formed flush with the front face thereof. In many cases, the thrust on the cutting bit will not be large enough to produce any rocking effect and hence, a shoulder or lip which extends in front of or overlies the cutting bit will not be required. The tool shown in Figures 9 and 10 does not have this front shoulder or lip. The holder is simply cut away to provide a pocket having an inside wall 71 and a rear wall 72 which are perpendicular to each other and which extend, respectively, to the front face 73 and the side face 74 of the holder. The rear wall 72, as before, is inclined to the side wall 74 at an angle equal to the front shear angle required for the cutting edge. The pocket formed by the wall 71 and 72 has a rounded bottom, preferably, as before.

The cutting bit 76 for use in the blade 70 may be of the same shape as that used in connection with the blade 20 and 50, namely, its front and rear faces will be parallel to each other and its front face and outside face inclined at an acute angle to each other to form a side cutting edge 75 and to provide suitable side clearance and a front shear angle for this edge. The bit will have a rounded bottom to conform to the rounded bottom in the blade. The bit, as before, may be secured in the blade by brazing, welding, or by any other suitable method.

Figure 11 shows a preferred method of making the pocket in the blade. The blade may be previously formed to shape and relieved according to the methods now employed in manufacturing high speed tools. Then, a pocket 53 may be milled in the blade by an end mill 80 which is rotated at high speed on its axis and which is simultaneously moved down the blade as indicated by the arrow 81 and fed into the blade in the direction indicated by the arrow 82 until a pocket of the proper depth has been cut. In this operation, the axis of the milling cutter, will, of course, be inclined to the side face 56 of the blade at an angle equal to the front shear angle of the bit which is to be positioned in the blade so that the front and rear walls of the pocket which are parallel to each other will, also, be parallel to the front face of the bit when it is secured in the pocket.

It will be noted with reference to the blades shown in Figures 5 to 11 inclusive that the upper portions of the pockets formed in the respective blades are cut away. This is to avoid a weak sharp point.

Figures 13 and 14 show a face mill constructed according to one embodiment of this invention and provided with side cutting blades of the type shown in Figures 5 to 10 inclusive and particularly of the type shown in Figures 9 and 10. In addition, the face mill 85 shown in these figures is provided with roughing or stocking blades for cutting the bottoms of the tooth grooves. In the preferred construction, the stocking blades 86 are alternated with the side cutting blades and the side cutting blades are alternately blades for cutting opposite side tooth faces of the gear blank. Thus the blades 87 have inside cutting edges 88 and the blades 89 have outside cutting edges 90. Each of the blades 87 and 89 comprise a stock of a soft, tough material having an inserted cutting bit of a hard cutting material which is secured in the stock in the manner already described with reference to Figures 1 to 12 inclusive. The stocking blade 86 consists, also, of a holder of a softer tough material having a hard cutting bit secured thereto.

Figures 15 and 16 show one form of stocking blade. Here the holder has a shank portion 92 which is provided with a hole 93 for the reception of the bolt 94 by means of which the holder is secured to the cutter head 85. The holder has also a blade portion having inclined sides 96 and 97 which are inclined to each other at an angle equal to substantially twice the pressure angle of the gear to be cut. The holder is recessed back from its front face to provide a pocket, which extends from side to side of the front face of the blade portion and from the top of the blade an appreciable distance downwardly. The bottom wall of this pocket is indicated by the line 99 and the rear wall by the line 100. The cutting bit 101 which is shaped to correspond to the shape of the pocket may be secured in the pocket by brazing or welding or in any other suitable manner. This cutting bit is provided with a top cutting edge 102 only, the sides 103 and 104 of this bit being relieved inwardly from this top cutting edge so that the bit will cut on the top edge only.

Another form of stocking tool is shown in Figures 17 to 19, inclusive. Here, a pocket 110 is milled in one side face 111 of the holder 112 a distance back of the front face 113 of the holder sufficient to leave a lip or tongue 114 which projects in front of the cutting bit 115 when the same is secured in place. The cutting bit 115 may be inserted from the side of this pocket and welded or brazed or otherwise secured in the pocket. This cutting bit, again, is provided with a top cutting edge 116 only, being relieved downwardly and inwardly of this top cutting edge, as indicated at 117 and 118 so that the bit can cut on its top edge only.

With a tool of the construction shown in Figures 13 and 14, gears can be roughed as well as finished without putting too heavy a load on the brittle cutting bits.

While I have described certain preferred embodiments of my invention and particular uses therefor, it will be understood that the invention is capable of further modifications and uses. In general, it may be said that this application is intended to cover any variations, uses, or adaptations of the invention following, in general, the principles of the invention and including such departures from the present disclosure as come within known or customary practise in the art to which the invention pertains and as may be applied to the essential features hereinbefore set forth and as fall within the scope of the appended claims.

Having thus described my invention, what I claim is:

1. A gear cutting tool comprising a rotary head and a plurality of inserted cutting blades, the cutting edges of which project beyond the adjacent surface of the head in the general direction of the head axis, each of said blades having a non-cutting portion formed with a pocket adapted to receive a cutting bit of a different material from the body portion of the blade; said bit having its outside and front faces formed at an acute angle to each other to provide a side cutting edge with suitable side clearance and front rake and said pocket having its rear wall inclined at an acute angle to the side wall of the non-cutting portion of the blade and parallel to the front face of the bit.

2. A gear cutting tool comprising a rotary head and a plurality of inserted cutting blades, the cutting sides of which project beyond the adjacent surface of the head in the general direction of the head axis, each of said blades having a non-cutting portion formed with a pocket adapted to receive a cutting bit of a different material from the body portion of the blade, said bit being of general trapezoidal shape in cross-section, and having its outside and front faces formed at an acute angle to each other to provide the blade side cutting edge and suitable side clearance and front rake for said edge, and said pocket having its rear wall inclined at an acute angle to the adjacent side of the non-cutting portion of the blade equal to the front rake angle of the bit and its inside wall perpendicular to the rear wall.

3. As an article of manufacture, a blade-body comprising a shank-portion shaped to be secured in a standard tool-holder and a bit-holding-portion having a bit-holding pocket formed in one side thereof, said pocket being so formed that its rear wall is inclined to the adjacent side wall of the bit-holding-portion of the blade-body at an angle equal to the front shear angle of the cutting bit adapted to be mounted in said blade-body.

4. As an article of manufacture, a blade-body comprising a shank portion shaped to be secured in a standard tool holder and a bit-holding-portion having a bit-holding pocket formed in one side thereof, the rear and side walls of which are at right angles to each other and the rear wall of which is inclined to the adjacent side wall of the bit-holding-portion at an angle equal to the front shear angle of the cutting bit adapted to be mounted in said pocket.

5. As an article of manufacture, a blade-body comprising a shank portion shaped to be secured in a standard tool-holder and a bit-holding-portion having a bit-receiving pocket formed in one side thereof at a sufficient distance back of the front face of the bit-holding-portion to provide a front lip which is adapted to extend in front of a cutting bit when the same is mounted in said pocket, the front and rear walls of said pocket being parallel and inclined to the adjacent side wall of the bit-holding-portion at an angle equal to the front shear angle of the bit.

6. As an article of manufacture, a blade-body comprising a shank portion shaped to be secured in a standard tool-holder and a bit-holding-portion having a bit-receiving pocket formed in one side thereof at a sufficient distance back of the front face of the bit-holding-portion to provide a front lip which is adapted to extend in front of a cutting bit positioned in said pocket, the front and rear walls of said pocket being parallel and inclined to the adjacent side wall of the bit-holding-portion at an angle equal to the front sheer angle of the bit and the inside side wall of the pocket being perpendicular to the front and rear walls thereof.

7. As an article of manufacture, a blade-body comprising a shank portion shaped to be secured in a standard tool holder and a bit-holding-portion having its top face and at least one side face relieved and having its side faces converging from the shank portion to its tip and having a bit receiving pocket formed in one side face thereof, the rear wall of which is inclined to the adjacent side wall of the bit-holding-portion at an angle equal to the front shear angle of the cutting bit adapted to be mounted in said blade-portion.

8. As an article of manufacture, a blade-body comprising a shank portion shaped to be secured in a standard tool holder and a bit-holding-portion having its top face and at least one side face relieved and having its side faces converging from the shank portion to the top face and having a bit-holding pocket formed in one side face thereof, the inside wall of which is inclined to the adjacent side face of the bit-holding-portion and the rear and side walls of which are at right angles to one another, said rear wall being inclined to the adjacent side wall of the bit-holding-portion at an angle equal to the front shear angle of the cutting bit which is adapted to be mounted in said pocket.

9. As an article of manufacture, a blade-body comprising a shank portion shaped to be secured in a standard tool holder and a bit-holding-portion having its top face and at least one side face relieved and having its side faces converging from the shank portion to the top face and having a bit-receiving pocket formed in one side face thereof a sufficient distance back of the front face of the bit-holding-portion to provide a front lip which is adapted to extend in front of a cutting bit positioned in said pocket, the front and rear walls of said pocket being parallel to each other and inclined to the adjacent side wall of the bit-holding-portion at an angle equal to the front shear angle of the bit.

10. As an article of manufacture, a blade-body comprising a shank portion shaped to be secured in a standard tool holder and a bit-holding-portion having its top face and at least one side face relieved and having its side faces converging from the shank portion to the top face and having a bit receiving pocket formed in one side thereof a sufficient distance back of the front face of the blade-portion to provide a front lip which is adapted to extend in front of a cutting bit when said bit is positioned in said pocket, the front and rear walls of which are parallel to one another and inclined to the adjacent side wall of the blade portion at an angle equal to the front shear angle of the bit, and the side wall of the pocket being perpendicular to the front and rear walls thereof.

11. As an article of manufacture, a blade body comprising a shank portion shaped to be secured in a standard tool holder and a bit-holding-portion having a top face and at least one side face relieved to provide cutting clearance and having its side faces converging from the shank portion to the top face and having a bit-receiving pocket formed in one side face thereof, the rear wall of which extends at an acute angle to the adjacent side wall of the bit-holding-portion and the inside wall of which is perpendicular to said rear wall.

12. A gear cutting tool comprising a cutting bit of a hard cutting material and a bit-holding body of a relatively softer material, said bit having its front and one side face inclined at an acute angle to one another to form a side cutting edge, and said blade-body being formed with a shank-portion shaped to be secured in a standard tool-holder and with a bit-holding-portion the top-face and at least one side face of which are relieved, said bit-holding portion having a pocket formed in one side face thereof to receive said cutting bit, the rear wall of said pocket being inclined to the adjacent side wall of the bit-holding-portion at an angle equal to the front shear angle of the bit and the inside wall of said pocket being perpendicular to the rear wall thereof.

13. A gear cutting tool comprising a cutting bit of a hard cutting material and a bit-holding body of a different material, said body being formed with a shank-portion adapted to be secured in a tool holder and a bit-holding-portion adapted to extend beyond said holder, said bit being of generally prismoidal shape and of trapezoidal shape in cross-section, the front and side faces of the bit being inclined to one another at an acute angle to form a side cutting edge, the bit-holding-portion of said holder having its side faces converging from the shank portion to its tip and being formed with a pocket in one side face shaped to receive said bit, the rear wall of said pocket being parallel to the front wall of the bit and the inside wall of the pocket being perpendicular to the rear, and the side wall of the bit-holding-portion of the body back of said pocket being inclined to the rear wall of the pocket at the same angle as the front face of the bit is inclined to the outside face thereof.

14. A blade for an inserted blade face mill gear cutter comprising a bit holding body formed with a shank portion adapted to be secured in a cutter head and with a bit-holding-portion adapted to extend beyond the cutter head, the sides of said bit-holding-portion being relieved from front to rear on the arc of a circle, said bit-holding-portion having a pocket formed in one side thereof, and a cutting bit secured in said pocket, the outside face of said bit being inclined at an acute angle to the front face thereof to form a side cutting edge, and the rear wall of said pocket being inclined at an acute angle to the adjacent side wall of the bit-holding-portion and parallel to the front face of the bit.

15. A gear cutting tool comprising a cutting bit of a hard cutting material and a blade body of a different material, said cutting bit having the general shape of a prismoid of generally trapezoidal cross-section, the front and rear faces of the bit being parallel and the front and outside faces of the bit being inclined at an acute angle to one another to form a side cutting edge, said blade body being formed with a shank portion adapted to be secured in a tool holder and with a bit-holding portion, the sides of which converge to the tip of said bit-holding portion, said bit-holding portion having a pocket formed in one side thereof and said bit being mounted in said pocket, said pocket being so formed that its rear wall is parallel to the front face of the bit when the bit is secured in the pocket, the side of said bit-holding portion back of the pocket therein being inclined to the rear wall of the pocket at the same angle as the front face of the bit is inclined to the outside face thereof.

LEON D. SLADE.